(12) United States Patent
Houssat et al.

(10) Patent No.: US 10,011,250 B2
(45) Date of Patent: Jul. 3, 2018

(54) ADAPTER COMPRISING FLEXIBLE TONGUES FOR A WIPING SYSTEM

(75) Inventors: Stéphane Houssat, Blanzat (FR); Loic Roussel, Salledes (FR); William Terrasse, Vic-le-Comte (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 1149 days.

(21) Appl. No.: 14/344,233

(22) PCT Filed: Aug. 8, 2012

(86) PCT No.: PCT/EP2012/065527
§ 371 (c)(1),
(2), (4) Date: Nov. 5, 2014

(87) PCT Pub. No.: WO2013/037571
PCT Pub. Date: Mar. 21, 2013

(65) Prior Publication Data
US 2015/0059115 A1     Mar. 5, 2015

(30) Foreign Application Priority Data
Sep. 12, 2011 (FR) .................................... 11 58087

(51) Int. Cl.
*B60S 1/38* (2006.01)
*B60S 1/40* (2006.01)

(52) U.S. Cl.
CPC .......... *B60S 1/4048* (2013.01); *B60S 1/3867* (2013.01); *B60S 1/3868* (2013.01); *B60S 2001/4051* (2013.01)

(58) Field of Classification Search
CPC ............ B60S 1/4048; B60S 2001/4051; B60S 1/4038; B60S 1/4041; B60S 1/4045; B60S 2001/4054; B60S 2001/4058; B60S 2001/4061; B60S 1/4064
See application file for complete search history.

(56) References Cited

U.S. PATENT DOCUMENTS

| | | | |
|---|---|---|---|
| 6,681,440 B2 | 1/2004 | Zimmer et al. |
| 7,621,016 B2 | 11/2009 | Verelst et al. |
| 7,669,276 B2 | 3/2010 | Verelst et al. |
| 2007/0067941 A1 | 3/2007 | Huang |

(Continued)

FOREIGN PATENT DOCUMENTS

| | | |
|---|---|---|
| DE | 103 26 266 A1 | 1/2004 |
| DE | 10 2009 000483 A1 | 4/2010 |

(Continued)

OTHER PUBLICATIONS

WO2010028866A1 (machine translation), 2010.*

(Continued)

*Primary Examiner* — Andrew A Horton
(74) *Attorney, Agent, or Firm* — Osha Liang LLP

(57) ABSTRACT

An adapter with flexible tongues for wiper systems is disclosed. The adapter has retractable locking buttons, each fixed to the end of a flexible tongue, that are disposed facing each other so that their respective tongues move toward each other on insertion of said adapter in said end fitting, said tongues being disposed so as to cross over during insertion of said adapter in said end fitting.

12 Claims, 3 Drawing Sheets

(56) References Cited

U.S. PATENT DOCUMENTS

2007/0226940 A1* 10/2007 Thienard .............. B60S 1/4038
15/250.32
2010/0186184 A1* 7/2010 Lee ....................... B60S 1/387
15/250.32
2011/0056041 A1 3/2011 Wu

FOREIGN PATENT DOCUMENTS

KR     10-2010-0023942 A     3/2010
WO     WO 2010028866 A1 * 3/2010 ............. B60S 1/387

OTHER PUBLICATIONS

First Office Action issued in corresponding Chinese Application No. 201280055497.6, dated Jul. 3, 2015 (14 pages).
International Search Report for corresponding International Application No. PCT/EP2012/065527, dated Oct. 5, 2012 (6 pages).

* cited by examiner

ADAPTER COMPRISING FLEXIBLE TONGUES FOR A WIPING SYSTEM

TECHNICAL FIELD

The present invention concerns an adapter for wiper systems and a wiper system equipped with such an adapter.

BACKGROUND

Although not exclusively so, this type of wiper system is intended to equip a motor vehicle, notably to enable wiping of the windows thereof.

Motor vehicles are routinely equipped with windscreen wiper systems for washing the windscreen and preventing disruption of the driver's view of their environment. These windscreen wipers are conventionally driven by a wiper arm effecting a to-and-fro angular movement and include elongate wipers in turn bearing wiper blades made from an elastic material. These wiper blades rub against the windscreen and remove water the driver's field of view.

The wipers are produced either in the standard form of articulated wiper arms that hold the wiper blade at a plurality of discrete locations or more recently in a so-called "flat blade" version as a semi-rigid assembly that holds the wiper blade over all its length.

In each of these two versions, the wiper is attached to the pivoted wiper arm of the windscreen wiper by an assembly consisting of:
an end fitting, which extends the wiper arm at its upper end,
a mechanical connector, fastened to the wiper (crimped onto the wiper arm or directly onto the flat wiper), and
an adapter, which is an intermediate part for fixing the mechanical connector to the end fitting and therefore to the wiper arm.

To fix the adapter into the end fitting it is already known to equip said adapter with at least one locking member fixed at the end of a flexible tongue, this locking member being able to cooperate with a complementary portion of the end fitting.

The documents U.S. Pat. No. 6,681,440, U.S. Pat. No. 7,669,276 and U.S. Pat. No. 7,621,016 disclose such adapters for wiper systems fastened to the mechanical connector by means of locking members fixed to the end of flexible tongues.

In the document U.S. Pat. No. 6,681,440 a locking member is disposed in the lower portion of the adapter and includes a projection relative to the flexible tongue to which it is fixed so that this projection can form an abutment for the complementary portion of the end fitting. However, in this prior art embodiment, the use of a single locking member makes it difficult to establish the connection between the adapter and the end fitting.

In the documents U.S. Pat. No. 7,669,276 and U.S. Pat. No. 7,621,016, two projections are provided on one side of the adapter, disposed on the lateral walls thereof, with two locking members on the other side of said adapter fixed to the end of flexible tongues and disposed on respective lateral walls of said adapter. However, in these prior art embodiments, the two locking members being disposed one facing the other, relative to the lateral walls of the adapter, the latter can be moved by deformation of their respective flexible tongues over only a short distance. It follows that manipulating these two locking members is difficult and that, in fact, it is also difficult to interengage the end fitting and the adapter at the level of the latter.

BRIEF SUMMARY OF THE INVENTION

The present invention makes an adapter easier to manipulate at the level of its locking members so that the connection between the adapter and the end fitting is simple for an operative to establish.

To this end, the invention is directed to an adapter for a wiper system, said wiper system comprising a wiper arm extended by an end fitting and a wiper fastened to the end fitting, said adapter being adapted to be disposed between said end fitting and said wiper, said adapter comprising at least two locking members each consisting of a retractable button at one end of a flexible tongue for locking the adapter relative to the end fitting, innovative in that said tongues are disposed so as to cross over during manipulation of the retractable buttons.

Accordingly, thanks to the present invention, the locking members can be easily manipulated by simply pressing on two opposite surfaces able to move in opposite directions such that said members move toward each other. Moreover, the flexible tongues of the locking members have a greater amplitude of movement in that they are disposed so as to cross over and not to bear one against the other.

In accordance with one feature of the invention, the retractable buttons are adapted to fasten the adapter relative to the end fitting by respectively cooperating with openings provided in lateral branches of the end fitting. Once mounted on the end fitting, the retractable buttons block all movement of the wiper arm in translation in the longitudinal direction.

According to another feature of the invention, the flexible tongues lie in different bending planes. The latter are defined by the plane in which each tongue is deformed when pressure is exerted on the retractable button connected to the flexible tongue concerned.

According to a further feature of the invention, the bending planes are superposed and parallel to each other. This guarantees harmonious movement of the retractable buttons so that their external faces remain substantially in the plane of the adapter.

The tongues may be articulated about different axes. However, they are preferably articulated about a common axis.

In such a situation, the flexible tongues are disposed in bending planes orthogonal to their common axis, said bending planes being sufficiently far apart for said tongues to cross over during manipulation of the retractable buttons.

The tongues preferably each have a first portion and a second portion to the end of which the corresponding retractable button is fixed, said first portion being inclined relative to said second portion at an angle substantially equal to 3° toward said corresponding retractable button. In this way, the angle between the two tongues can be increased by 6°, which enables better mechanical retention of the adapter in the end fitting by means of their respective retractable buttons and orifices.

In this case, one retractable locking button advantageously has at the junction between the first portion and the second portion an abutment adapted to cooperate with the other retractable button so as to form an additional pivot point between said first portion and said second portion disposed between the portions of at least one of the tongues. Thus it is possible to increase the force with which the tongues bear against the lateral branches of the end fitting when the adapter is accommodated in said end fitting.

This abutment may have a rounded end in order to facilitate rotation about the additional pivot point.

In order to interengage the adapter in accordance with the invention and the end fitting, the retractable buttons, initially disposed in a nominal position, are adapted to move toward each other on deformation of their respective flexible tongues and then to return to said nominal position by each cooperating with an opening provided for this purpose in the upper portion of the end fitting.

In order to facilitate manipulation of the retractable locking buttons, the surfaces of the retractable locking buttons are provided on the side opposite their respective tongues with striations.

At least one of the retractable locking buttons is advantageously extended by a holding surface which makes it possible to hold the adapter by means of a sucker able to stick onto this surface in order to move said adapter before assembly onto the connector.

The present invention also concerns a wiper system comprising a wiper arm extended at one end by an end fitting, a wiper fastened to a mechanical connector and an adapter connected to said end fitting and to said mechanical connector, said adapter comprising at least two retractable locking buttons respectively fixed to the ends of flexible tongues by means of which said adapter is adapted to be fastened to said end fitting by respectively cooperating with openings provided for this purpose in lateral portions of the end fitting, characterized in that:

said retractable locking buttons are disposed facing each other so that their respective tongues move toward each other on insertion of said adapter in said end fitting, and said tongues are disposed so as to cross over during insertion of said adapter in said end fitting.

BRIEF DESCRIPTION OF THE DRAWINGS

The figures of the appended drawings explain how the invention may be put into effect. In these figures, identical references designate technically similar items.

In the remainder of the description, the terms longitudinal and lateral refer to the orientation of the wiper arm on which the windscreen wiper is mounted. The longitudinal direction corresponds to the main axis of the wiper arm while the lateral orientations correspond to orientations perpendicular to the axis of the wiper arm in its rotation plane. In the case of the longitudinal directions, the terms exterior and interior are referred to the centre of rotation of the windscreen wiper arm. Moreover, the directions referred to as upper or lower correspond to orientations perpendicular to the plane of rotation of the wiper arm.

DETAILED DESCRIPTION OF THE INVENTION

Figure 1:
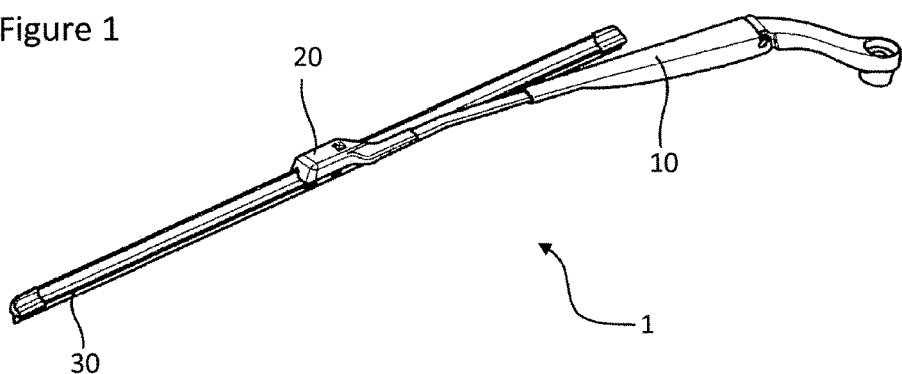
FIG. 1 is a general perspective view of a prior art wiper system.
Figure 2:
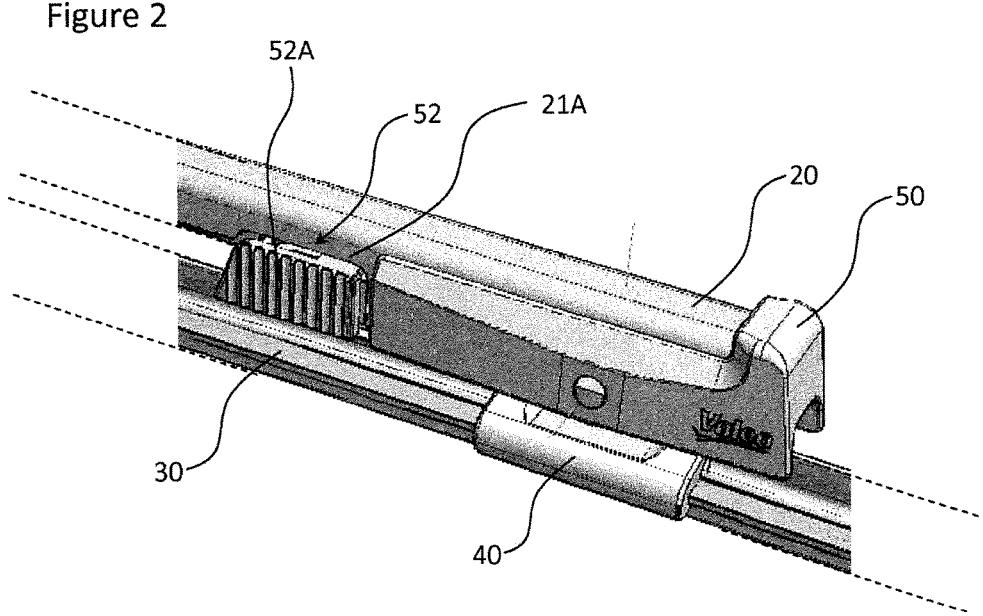
FIG. 2 is a diagrammatic perspective view to a larger scale of the portion of a wiper system in accordance with the invention in which the mechanical connector, the adapter and the end fitting are assembled.
Figure 3:
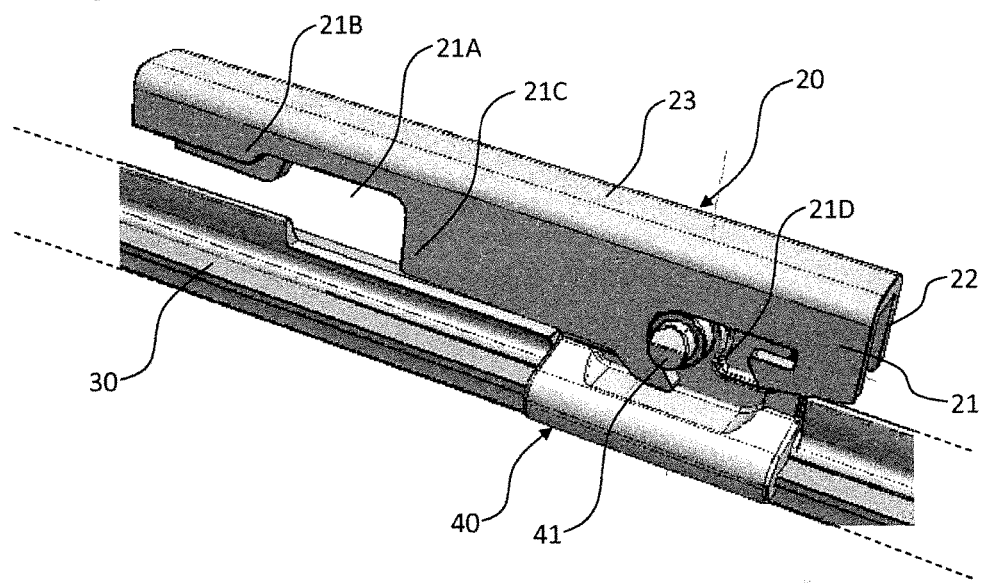
FIG. 3 is a diagrammatic view similar to that of FIG. 2 and shows the assembly of the mechanical connector to the end fitting.

Referring to FIGS. 1 to 3, there is seen a windscreen wiper 1 conventionally comprising a wiper arm 10 extended at its exterior end by an end fitting 20 that is fixed on the interior side by crimping it to said wiper arm 10. The end fitting 20 is inserted into an adapter 50 carrying the wiper 30 via its mechanical connector 40.

In FIG. 2, it is seen that the end fitting 20 is intended to be inserted in the adapter 50 by a movement in translation along a longitudinal axis, so as to come into the position of use, in which this adapter is positioned so that it is abutted against a shape imparted to the end fitting 20, with which it is intended to cooperate. It is clear from this that the end fitting 20 is accommodated in the adapter 50.

The adapter 50 is then fixed to the end fitting 20 in a reversible manner by means of two locking members 51 and 52 including retractable buttons 51A and 52A each of which cooperates with an opening provided for this purpose in the lateral branches 21 and 22 of the end fitting 20.

As shown in FIG. 3, the end fitting 20 has on the exterior side an inverted U-shape comprising two lateral branches 21 and 22 extending toward the windscreen and a base 23 in its upper portion. In the two lateral branches 21 and 22 are provided two orifices or openings (21A for the branch 21) in which the retractable buttons 51A and 52A of the locking members 51 and 52 of the adapter 50 are adapted to be accommodated. Each of the lateral branches 21 and 22 also includes two translation abutments (21B and 21C for the branch 21) facing the retractable buttons 51A and 52A. Moreover, each of the lateral branches 21 and 22 has on the side opposite the orifices (21A for the branch 21) for the locking members 51 and 52 an orifice or opening (21D for the branch 21) at the level of which the end fitting is directly connected to the mechanical connector 40, the latter including to this end two buttons (only one of which, designated by the reference 41, is shown in FIG. 3) of complementary shape to said orifices (21D for the branch 21). Thus the end fitting 20 is fixed on one side to the adapter 50 and on the other side to the connector 40, which makes the assembly forming the windscreen wiper system in accordance with the invention mechanically robust.

The mechanical connector 40 is fastened non-removably to the wiper 30 so as to transmit the mechanical force coming from the wiper arm 10 to said wiper 30. This mechanical connector 40 is substantially the shape of a parallelepiped extending along the axis of the wiper 30, with two lateral flanks that extend laterally as two swivels or buttons 41 which fasten the mechanical connector 40 to the adapter 50 and by virtue of their cooperation with the openings (including the opening 21D) formed in the lateral walls 21 and 22 of the adapter 50, provide a pivot for rotation of the wiper 30 relative to the wiper arm 1.

Figure 4:
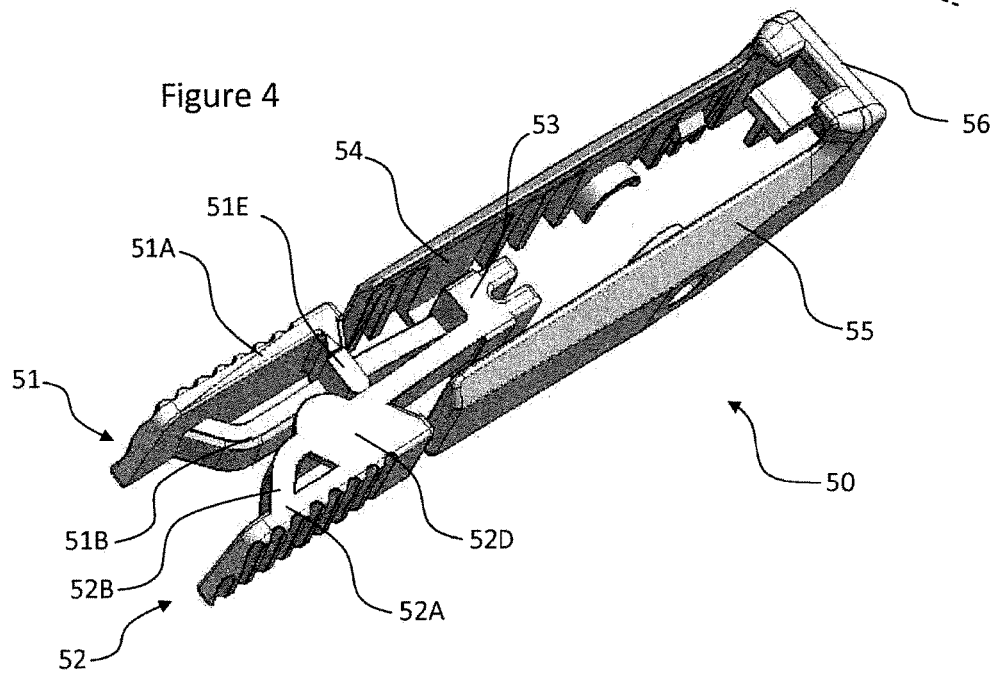
FIGS. 4 to 6 are three diagrammatic perspective views of the adapter from FIG. 2 in three different orientations.
Figure 5:
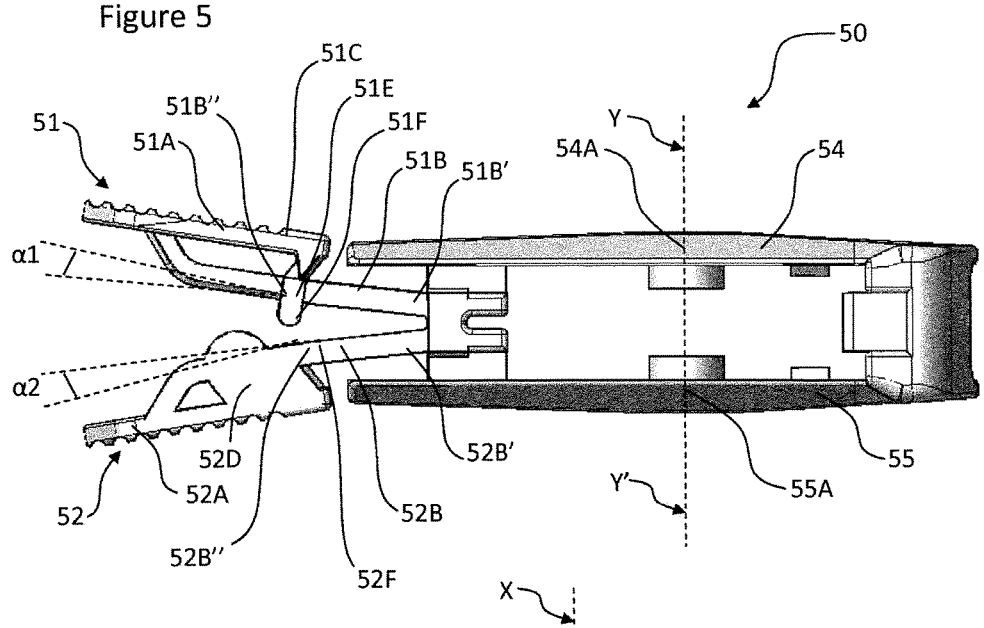
Figure 6:
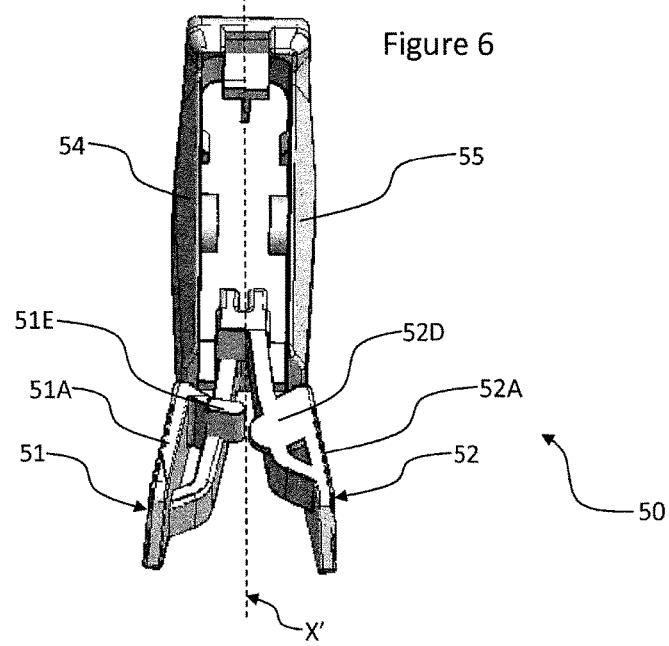

Referring now to FIGS. 4 to 6, the adapter 50 is seen in detail. The adapter 50 is yoke-shaped, its shape being complementary to the external volume of the end fitting 20, the latter being accommodated in an internal volume delimited by the adapter 50. Two lateral walls 54 and 55 are joined by a bridge 56. This adapter 50 also includes two holes 54A and 55A produced through the lateral walls 54 and 55, respectively, and having the same axis Y-Y' (FIG. 5) intended to enable fixing of the adapter 50 to the mechanical connector 40 and to provide a pivot for rotation between the wiper 30 and the wiper arm 10 when the wiper system is assembled. The wiper 30 therefore has at least one degree of freedom in rotation relative to the wiper arm 10 and more specifically relative to the end fitting 20, in order to allow said wiper 30 to follow the curvature of the window to be wiped.

The adapter 50 further includes the two locking members 51 and 52 respectively taking the form of retractable buttons 51A and 52A fixed to the ends of the flexible arms or tongues 51B and 52B. These locking members 51 and 52 are adapted to enable fixing of the adapter 50 relative to the end fitting 20 by cooperating with the respective openings (including the opening 21A) produced in the lateral branches 21 and 22 of the end fitting 20 (FIG. 3).

As shown in FIGS. 4 to 6, the two locking members 51 and 52 are disposed facing each other. Here "facing each other" means that at least a portion of a first locking member 51 is in line with a portion of a second locking member 52. In other words, the invention covers the situation in which the two locking members are offset relative to each other in the longitudinal direction.

In accordance with a preferred embodiment, the two locking members 51 and 52 are disposed opposite each other on opposite sides of a longitudinal axis of the adapter 50. The retractable buttons 51A and 52A therefore advantageously face each other.

The locking members 51 and 52 are disposed so that their respective flexible tongues 51B and 52B and their retractable buttons 51A and 52A move toward one another when the adapter 50 is being inserted in the end fitting 20. Accordingly, by simply pinching the two retractable buttons 51A and 52A, the two locking members 51 and 52, initially disposed in a nominal position in which the end fitting 20 is not inserted, can be moved toward each other in order to allow the openings (including the opening 21A) to pass. Then, when these openings (including the opening 21A) are disposed in a complementary manner facing the two retractable buttons 51A and 52A, the two retractable buttons 51A and 52A can be released to enable locking of the end fitting 20 inside the adapter 50.

Thus the flexible tongues 51B and 52B are deformed in a plane, referred to as the bending plane, and are arranged relative to each other so that the bending plane of the first flexible blade is different from that of the second flexible blade, and these bending planes can moreover be parallel to each other.

Moreover, in accordance with the present invention, the flexible blades 51B and 52B are articulated about a common axis X-X' (FIG. 6). This common axis X-X' passes through an articulation 53 which has an H-shaped section. These flexible tongues originate from this articulation 53 and are disposed in the bending planes, the latter being orthogonal to this common axis X-X'. These bending planes are sufficiently far apart, i.e. so that the first tongue overlaps the second tongue without touching it, to prevent said flexible tongues 51B and 52B meeting, in other words touching, when the end fitting 20 is inserted in the adapter 50 or actuated manually. In this way, the locking members 51 and 52 can be moved, by deformation of their respective flexible tongues 51B and 52B, beyond a play on deformation limited by the fact that said flexible tongues 51B and 52B would be in the same plane orthogonal to the common axis X-X', which allows greater relative movement of the retractable buttons 51A and 52A and therefore facilitates use of the adapter 50 to connect it to the end fitting 20.

Moreover, as seen in FIG. 5, the tongue 51B comprises two portions: a first portion 51B', close to the common axis X-X', and a second portion 51B", at the end of which the retractable button 51A is fixed. Similarly, the tongue 52B comprises two portions: a first portion 52B', close to the common axis X-X', and a second portion 52B", to the end of which the retractable button 52B is fixed. In accordance with one particularly advantageous feature of the invention, the first and second portions of each tongue are inclined relative to each other at a non-zero angle ($\alpha 1$ for the locking member 51, $\alpha 2$ for the locking member 52), preferably substantially equal to 3°. This angle is oriented in the direction of the corresponding retractable button. This configuration offers improved mechanical retention of the adapter 50 when it is accommodated inside the end fitting 20, in that the tongues are prestressed against the edges of the lateral branches 21 and 22 of said end fitting 20.

The adapter 50 is thus recognizable in that it features two flexible tongues 51B and 52B which extend in directions converging on the common axis X-X', these two directions defining an angle between 5° and 25° in the unstressed position, i.e. when the retractable buttons 51A and 52A are not actuated.

The flexible tongues 51B and 52B overlap in the sense that each moves in a separate plane, their thicknesses being adapted so that the first flexible tongue 51B does not rub on the second flexible tongue 52B when the retractable buttons are actuated.

This general organization of the locking members 51 and 52 has the advantage of allowing sufficient movement of the retractable buttons 51A and 52A to disengage them from the respective opening (21A for the lateral branch 21) provided in each lateral branch 21 and 22, at the same time as having the smallest possible dimension in the direction Y-Y', which contributes to enhancing the exterior aesthetics of the wiper system.

It will moreover be noted that, on the side opposite their respective tongues 51B and 52B, the retractable locking buttons 51A and 52A are provided with striations (including the striations 51C in FIG. 5) that enable better manipulation of these buttons when connecting the adapter 50 to the end fitting 20.

It will also be noted that at least one of the two retractable buttons (the button 51A in FIG. 6) may be extended by a holding surface 52D, by means of which the adapter 50 may be moved by means of suction, before assembly of said adapter to the connector.

It will moreover be noted that one of the two retractable locking buttons, here the button 51A, can have, at the junction between the first portion 51B' and the second portion 51B", an abutment 51E adapted to cooperate with the other retractable button 52A so as to form an additional pivot point 51F between said first portion 51B' and said second portion 51B". This abutment makes it possible to increase the force with which the tongues 51B and 52B bear against the lateral branches 21 and 22 of the end fitting 20 when the adapter 50 is accommodated in said end fitting 20 and therefore to guarantee that said tongues are securely engaged on the edges of said lateral arms. It will be noted that this abutment can advantageously have a rounded end, which makes it possible to facilitate rotation about the additional pivot point 51F.

In this configuration, the tongues can function in three stages:
  the tongues are moved toward each other during the phase of presentation of the adapter 50 in the end fitting 20 (the abutment 51E comes into abutting engagement on the opposite tongue 52B);
  the retractable buttons 51A and 52A are depressed manually to allow rotation of the second portions 51B" and 52B" of the tongues 51B and 52B about the additional pivot point 51F, which therefore makes it possible to move the retractable buttons 51A and 52A toward each other; and
  when the adapter 50 is accommodated in the end fitting 20, the retractable buttons 51A and 52A are released manually so that said retractable buttons 51A and 52A come to bear against the lateral branches 21 and 22 of the end fitting, which produces the mechanical retention of said adapter 50 inside said end fitting 20.

Moreover, the adapter 50 therefore being constrained in the end fitting 20, only manual intervention enables unlocking of said adapter 50.

The present invention is described above for an adapter for a wiper system in which the number of locking members is equal to two, but it goes without saying that the present invention may be employed with a different number of locking members, for example three.

It will finally be noted that the adapter 50 and all the components that constitute it are provided by a single part, manufactured by moulding the same plastic material, for example.

REFERENCE NUMERAL LIST

1 Windscreen wiper (whole assembly)
10 Wiper arm
20 End fitting
21 Lateral branch
   21A Orifice or opening
   21B Translation abutment
   21C Translation abutment
   21D Orifice or opening
22 Lateral branch
23 Base
30 Wiper (blade)
40 Mechanical connector
41 Button or swivel
50 Adapter
51 Locking member
   51A Retractable button
   51B Flexible arm or flexible tongue
      51B' First portion
      51B" Second portion
   51C Striations
   51E Abutment
   51F Pivot Point
52 Locking member
   52A Retractable button
   52B Flexible arm or flexible tongue
      52B' First portion
      52B" Second portion
   52D Holding surface
   52F Pivot Point
53 Articulation
54 Lateral wall
   54A Hole
55 Lateral wall
   55A Hole
56 Bridge
$\alpha 1$ non-zero angle for locking member 51
$\alpha 2$ non-zero angle for locking member 52
X-X' Axis
Y-Y' Axis

The invention claimed is:

1. An adapter for a wiper system, said wiper system comprising a wiper arm extended by an end fitting and a wiper fastened to the end fitting, said adapter being adapted to be disposed between said end fitting and said wiper, said adapter comprising:
at least two locking members each consisting of a retractable button provided at one end of a flexible tongue for locking the adapter relative to the end fitting, wherein said tongues are disposed so as to simultaneously cross over a center plane during retraction of the retractable buttons in a lateral width direction,
wherein the center plane is central with respect to a lateral width of the adapter in the lateral width direction.

2. The adapter according to claim 1, wherein the retractable buttons are adapted to fasten the adapter relative to the end fitting by respectively cooperating with openings provided in lateral branches of the end fitting.

3. The adapter according to claim 1, wherein the flexible tongues lie in different bending planes.

4. The adapter according to claim 3, wherein the flexible tongues are parallel to each other.

5. The adapter according to claim 1, wherein the flexible tongues are articulated about a common axis.

6. The adapter according to claim 5, wherein the flexible tongues are disposed in bending planes orthogonal to their common axis, said bending planes being sufficiently far apart for said tongues to simultaneously cross over the center plane during retraction of the retractable buttons in the lateral width direction.

7. The adapter according to claim 1, wherein the tongues each have a first portion and a second portion to the end of which the corresponding retractable button is fixed, said first portion being inclined relative to said second portion at an angle substantially equal to 3° toward said corresponding retractable button.

8. The adapter according to claim 7, wherein one retractable locking button has, at the junction between the first portion and the second portion, an abutment adapted to cooperate with the other retractable button so as to form pivot point between said first portion and said second portion.

9. The adapter according to claim 1, wherein the retractable buttons, initially disposed in a nominal position, are adapted to move toward each other on deformation of their respective flexible tongues and then to return to said nominal position by each cooperating with an opening provided for this purpose in the upper portion of the end fitting.

10. The adapter according to claim 1, wherein surfaces of the retractable locking buttons on the side opposite their respective tongues are provided with striations.

11. The adapter according to claim 1, wherein at least one of the retractable locking buttons is extended by a holding surface.

12. A wiper system comprising:
a wiper arm extended at one end by an end fitting;
a wiper fastened to a mechanical connector; and
an adapter connected to said end fitting and to said mechanical connector, said adapter comprising at least two retractable locking buttons respectively fixed to the ends of flexible tongues by which said adapter is adapted to be fastened to said end fitting by respectively cooperating with openings provided for this purpose in lateral portions of the end fitting, wherein:
said retractable locking buttons are disposed facing each other so that their respective tongues move toward each other on insertion of said adapter in said end fitting, and
said tongues are disposed so as to simultaneously cross over a center plane during insertion of said adapter in said end fitting,
wherein the center plane is central with respect to a lateral width of the adapter in a lateral width direction.

\* \* \* \* \*